United States Patent [19]

Satokata

[11] Patent Number: 4,866,689
[45] Date of Patent: Sep. 12, 1989

[54] FOCUSING AND TRACKING ERROR CONTROL SYSTEM FOR AN OPTICAL RECORDING-REPRODUCING DEVICE

[75] Inventor: Akihiko Satokata, Tatsumo, Japan

[73] Assignee: Olympus Optical Co., Ltd., Tokyo, Japan

[21] Appl. No.: 159,859

[22] Filed: Feb. 24, 1988

[30] Foreign Application Priority Data

Mar. 25, 1987 [JP] Japan .................................. 62-68796

[51] Int. Cl.$^4$ ................................................ G11B 7/00
[52] U.S. Cl. ........................................ 369/44; 365/45; 250/201
[58] Field of Search .................................. 369/43–47; 358/342; 250/201–204

[56] References Cited

U.S. PATENT DOCUMENTS

| | | | |
|---|---|---|---|
| 4,617,654 | 10/1986 | Gross et al. | 369/45 X |
| 4,651,314 | 3/1987 | Yoshikawa et al. | 369/45 |
| 4,774,401 | 9/1988 | Yamada et al. | 250/201 |

*Primary Examiner*—Robert L. Richardson
*Attorney, Agent, or Firm*—Armstrong, Nikaido, Marmelstein, Kubovcik & Murray

[57] ABSTRACT

A control system for an optical recording-reproducing device divides and detects reflected light from an optical disk by a plurality of photo-detecting elements. The detection outputs are divided by a detection output corresponding to the total quantity of reflected light for the purpose of obtaining control signals for correcting tracking error and focus error. The control system for the optical recording-reproducing device is constituted by a device for logarithmically compressing detection currents from the photo-detecting elements and a device for logarithmically compressing a detection current corresponding to the total quantity of reflected light. A subtraction is performed between the detected outputs, which have been compressed logarithmically, and the detected output corresponding to the total quantity of light, which has also been compressed logarithmically, for the purpose of executing a division between the detected outputs and the detected output corresponding to the total quantity of reflected light. As a result, a wide dynamic range can be realized, and the magnitude of any error can be correctly obtained, regardless of the total quantity of reflected light, so that a siimple, monolithic circuit can be realized.

10 Claims, 5 Drawing Sheets

FOCUSING AND TRACKING ERROR CONTROL SYSTEM FOR AN OPTICAL RECORDING-REPRODUCING DEVICE

FIELD OF THE INVENTION

This invention relates to a control system for an optical recording-reproducing device for recording information on a recording media and reproducing information from the recording media by way of converging and applying a light beam, such as laser beam onto the recording media.

BACKGROUND OF THE INVENTION

In an optical recording-reproducing device for recording information and reproducing the same by applying a laser beam onto a recording medium such as an optical disk, a laser beam of a relatively higher level than that used for reproducing is generally used when recording is conducted. As a result of this, the surface conditions of the disk are changed for the purpose of achieving recording, while a low-level laser beam is used for reading information from the optical disk when reproducing is conducted. In order to record and reproduce information by means of such laser beams, a focusing servo system for correctly aligning the focal point of the laser beam on the surface of the disk and a tracking servo system for correctly making the focal point of the laser beam follow the recording tracks, even if the surface of the disk deflects, are needed.

When, for example, focus control is performed by means of such a servo system, a photodetector 2 is, as shown in FIG. 1, provided in such a manner that it receives a light beam reflected from the disk 1, for the purpose of detecting any focus error. Then a detection signal obtained by the photodetector 2 is amplified by a pre-amplifier 3, and gain and phase compensations are applied to the signal by a gain and phase compensating circuit 4. The detection signal is then input to a power amplifier 5. In response to an output from the power amplifier 5, an electrical current is passed through an actuator 6 formed by an electromagnetic drive means or the like for vertically and horizontally moving an optical system. As a result of this, focus control is performed. A triangular wave generator 7 acts to made the actuator 6 move the optical system in a sawtooth manner in order to move the optical system for the purpose of first aligning the focal point of the optical system with the disk surface. A switch circuit 8 is driven by an output signal from a level detecting circuit 9 and is switched in such a manner that it supplies the triangular signal to the actuator 6 while the optical system is being moved, while a signal from the gain and phase compensating circuit 4 is supplied to the actuator 6 after the movement of the optical system has been completed. An amplifier 10 amplifies the detection signal from the photodetector 2, and the thus-obtained output is applied to the level detecting circuit 9.

In order to obtain a focus error signal or tracking error signal from the detection signal output from the photodetector, a photodetector formed by a PIN photodiode divided into, for example, four pieces is employed. This error signal detector is, as shown in FIG. 2, constituted by two operational amplifiers 11 and 12, each adding detection currents $I_A$, $I_B$, $I_C$ and $I_D$ supplied from corresponding photodiodes, and an operational amplifier 13 for subtracting the added value. Each error signal is obtained using the output signal from the operational amplifier 13 for subtracting.

The magnitude of the output of the laser beam changes by a factor of approximately 10 from when information is, as described above, written onto a recording medium and when information is read from the recording medium. Furthermore, the detected quantity of light changes by a factor of 100 or more due to the changes in the reflectance of the recording medium. Therefore, in the above control system in which an error signal obtained from the conventional simple operational amplifier is used, the focus error signal and tracking error signal cannot be accurately obtained if the magnitude of the detection signal obtained by the photodetector is the minimum level.

In order to solve the above-described problem, a control system has been disclosed in Japanese Patent Laid-Open No. 248235/1986 in which an error detection output obtained from a detection signal from the photodetector is divided by a detection output (sum of the quantity of light signal) corresponding to the sum of the quantity of reflected light obtained from the detection signal from the photodetector, for the purpose of obtaining a focus error control signal or a tracking error control signal. As a result of this, a control system is achieved which provides control in proportion to error and which does not depend on the quantity of reflected light.

In order to achieve the above-described division, a system is disclosed in which the switching control circuit is controlled by a sum of the quantity of light signal so as to switch the gain for the purpose of standardizing error signals. Furthermore, a feedback method is disclosed in which an analog multiplier is used. The analog multiplier is provided with an AGC circuit and a gain control amplifying circuit in such a way that the gain control amplifying circuit is controlled by the gain control voltage of the AGC circuit for the purpose of performing the division.

However, the conventional dividing means must have a complicated circuit, and a large number of expensive external parts such as a capacitor to provide a time constant for the AGC circuit must be provided. Furthermore, adjustment of the characteristics to delete offset is difficult to conduct, and a wide dynamic range is impossible to obtain.

SUMMARY OF THE INVENTION

An object of the present invention is to solve the above-described problems raised in the conventional control systems for the optical recording-reproducing devices, and to provide a control system for an optical recording-reproducing device in which the dynamic range can be enlarged, and which does not need many external parts, whereby the structure of the circuits can be simplified, and a monolithic circuit can be realized.

The control system for an optical recording-reproducing device according to the present invention wherein reflected light from an optical disk is divided and detected by a plurality of photodetecting elements so as to divide the detected outputs by an output corresponding to the total quantity of the reflected light for the purpose of obtaining control signals for correcting tracking errors and focus errors. The control system is constituted by: a device for logarithmically compressing detection currents from the photodetecting elements; a device for logarithmically compressing a detection current corresponding to the total quantity of reflected light, whereby subtraction between detection outputs, which have been logarithmically compressed, and the detection output corresponding to the total quantity of reflected light, which has been logarithmically compressed, is performed so that division between detection outputs and the detection output corresponding to the total quantity of reflected light is executed.

In the structure described above, the division of the detected current is executed by subtracting, in a logarithmic compression manner, the detection currents from the photo-detecting elements and the detection currents corresponding to the total quantity of reflected light. As a result of this, the dynamic range can be enlarged and the magnitude of error can be correctly obtained, irrespective of the sum of the quantity of the reflected light. Furthermore, since the control system uses a current mode in which the detection current is directly and logarithmically compressed, the system can be easily applied to ICs and the circuit can be made of a monolithic type of circuit which will be helpful in terms of obtaining improved pair characteristic.

PREFERRED EMBODIMENT OF THE INVENTION

Referring to the accompanying drawings, an embodiment of the present invention will now be described.

Figure 1:
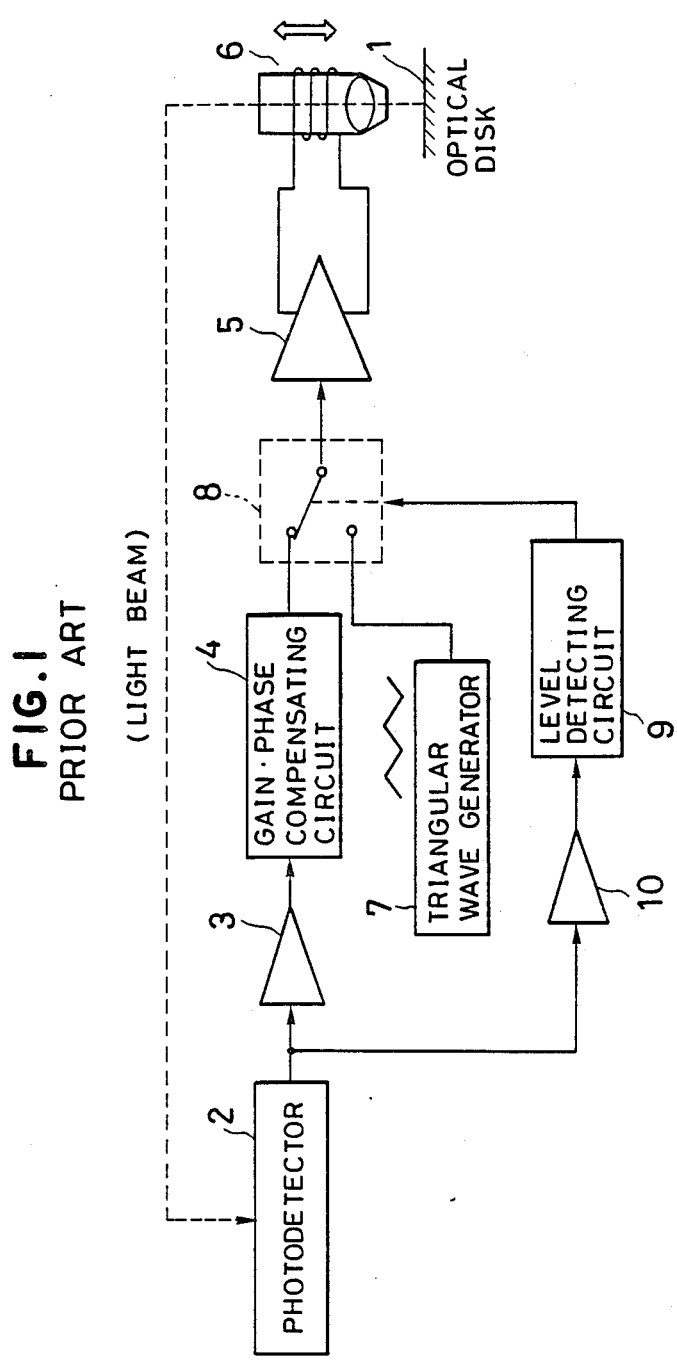
FIG. 1 illustrates a basic structure of a focus control circuit of a conventional optical recording-reproducing device.
Figure 2:
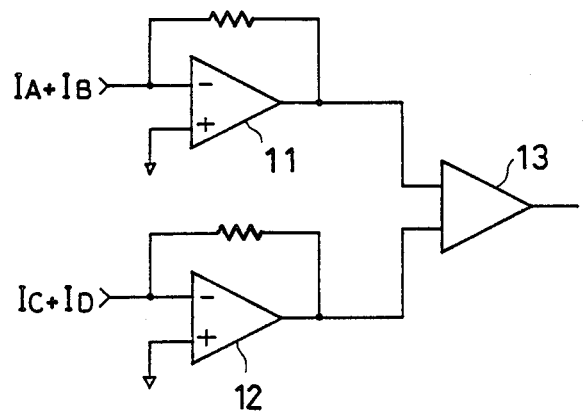
FIG. 2 illustrates an example of an error signal generating circuit.
Figure 3A:
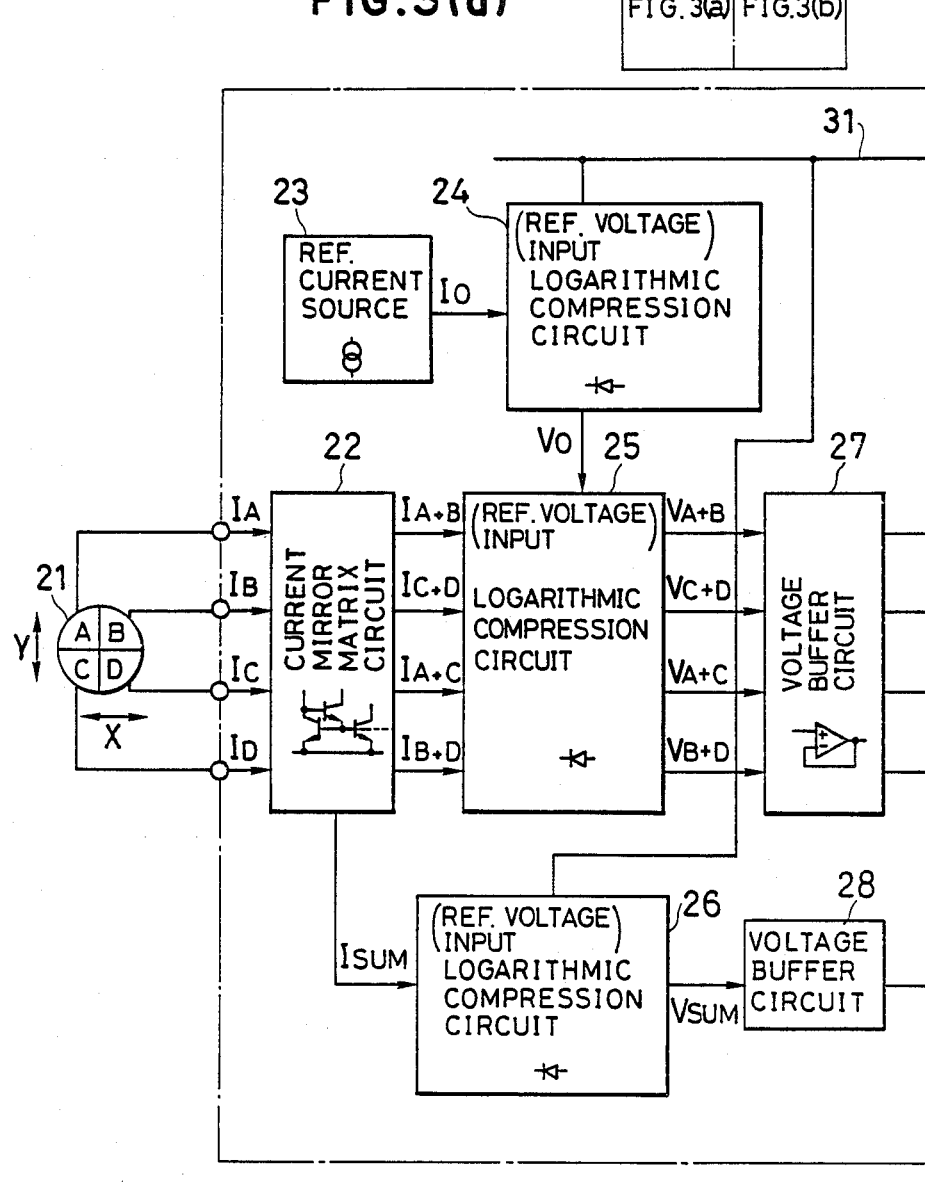
FIGS. 3a–3b are block diagrams illustrating an embodiment of a control system for an optical recording-reproducing device according to the present invention.
Figure 3B:
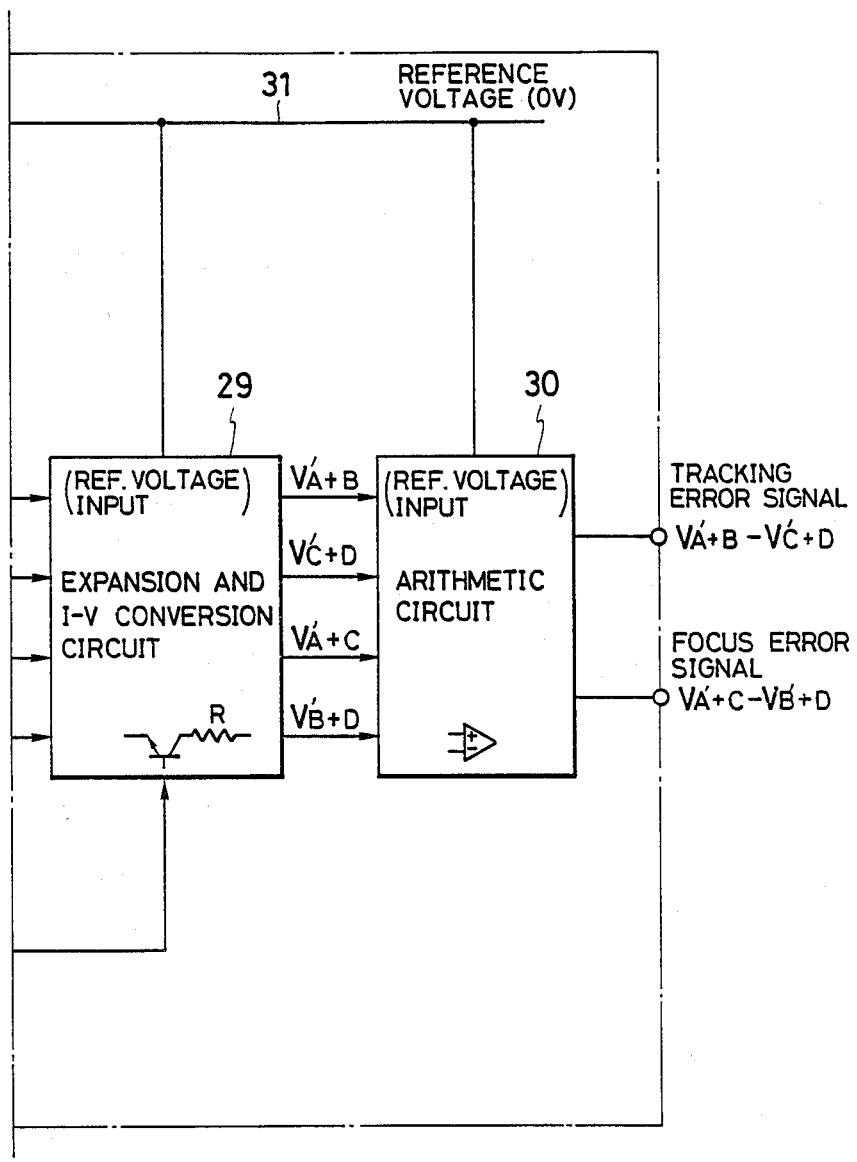

FIGS. 3a–3b are block diagrams illustrating a control system for an optical recording-reproducing device according to an embodiment of the present invention.

Referring to the FIG., reference numeral 21 represents a photodetector consisting of four-part PIN photodiodes A, B, C, and D, each of which outputs an optical detection current $I_A$, $I_B$, $I_C$, and $I_D$, respectively. A tracking error control signal is obtained by making use of a differential signal of a combined detection current $I_{A+B}(=I_A+I_B)$ of the photodiodes A and B arranged in the X direction and another combined detection current $I_{C+D}(=I_C I_D)$ of the photodiodes C and D arranged in the same direction. Similarly, a focus error control signal is obtained by making use of a differential signal of a combined detection current $I_{A+C}(=I_A+I_C)$ of the photodiodes A and C arranged in the Y direction and another combined detection current $I_{B+D}(=I_B+I_D)$ of the photodiodes B and D arranged in the same direction. Reference numeral 22 represents a current mirror matrix circuit which adds the optical detection currents $I_A$, $I_B$, $I_C$, and $I_D$ of the divided photodiodes A, B, C, and D arranged in the X and Y directions of the above described photodetector 21 so as to generate the combined detection currents $I_{A+B}$, $I_{C+D}$, $I_{A+C}$ and $I_{B+D}$. Furthermore, the current mirror matrix circuit 22 adds all of the optical detection currents $I_A$, $I_B$, $I_C$, and $I_D$ of the divided photodiodes A, B, C, and D so as to generate a sum of the quantity of light-detection current $I_{SUM}(I_{A+B+C+D})$ Reference numeral 23 represents a reference current source. Reference numeral 24 represents a reference-current logarithmic compression circuit which logarithmically compresses a reference current $I_o$ obtained from the reference current source 23, and which obtains the logarithmically compressed reference current $I_o$ as a voltage using a reference voltage 31 as a reference level. Reference numeral 25 represents a combined detection current logarithmic compression circuit which logarithmically compresses the combined detection currents $I_{A+B}$, $I_{C+D}$, $I_{A+C}$ and $I_{B+D}$ from the current mirror matrix circuit 22 for the purpose of obtaining voltage levels $V_{A+B}$, $V_{C+D}$, $V_{A+C}$ and $V_{B+D}$ from a reference voltage $V_o$ which is the output voltage from the reference current logarithmic compression circuit 24. Reference numeral 26 represents a sum of the quantity of light-detection current logarithmic compression circuit which logarithmically compresses the sum of the quantity of light-detection current $I_{SUM}$ for the purpose of obtaining a voltage level $V_{SUM}$ from the reference voltage 31.

Reference numerals 27 and 28 represent voltage buffer circuits provided for converting impedances. Reference numeral 29 represents an expansion and I-V conversion circuit. The expansion and I-V conversion circuit 29 is provided for the purpose of subtracting the logarithmically compressed combined detection signals, which have been impedance-converted by means of the voltage buffer circuits 27, and the logarithmically compressed sum of the quantity of light signal, which has been impedance-converted by means of the voltage buffer circuit 28 in a similar manner. As a result of this, the combined detection signals are expanded by way of subtraction, and thus expanded combined detection signals are I-V converted. Reference numeral 30 represents an arithmetic circuit for subtracting an output $V'_{C+D}$ from an output $V'_{A+B}$ and subtracting an output $V'_{B+D}$ from an output $V'_{A+C}$, which outputs being supplied from the expansion and I-V conversion circuit 29, for the purpose of obtaining a tracking error signal $(V'_{A+B}-V'_{C+D})$ and a focus error signal $(V'_{A+C}-V'_{B+D})$ The operation of the control system for the above structure will now be described.

When a disk is irradiated with a laser beam, and the 4-part photodetector 21 is irradiated with a spot of reflected light of the laser beam, in a state where both tracking and focus are locked (the servo system is operating and both tracking and focus are completely controlled), the central portion of the photodetector 21 is irradiated with the spot of reflected light. The spot of reflected light moves in the Y direction in response to tracking errors and in the X direction in response to focusing errors, in such a manner that the degree of the movement corresponds to the magnitude of the error. As a result of this, detection currents $I_A$, $I_B$, $I_C$, and $I_D$ are generated from the corresponding photodiodes A, B, C, and D in accordance with the quantity of applied reflected-light.

The detection currents $I_A$, $I_B$, $I_C$, and $I_D$ from the corresponding photodiodes A, B, C, and D of the photodetector 21 are supplied to the current mirror matrix circuit 22 wherein detection currents of pairs of photodiodes in the X and Y directions are added. That is, $I_A$ and $I_B$, are added, whereby a combined detection current $I_{A+B}$ is generated; $I_C$ and $I_D$ are added, whereby a combined detection current $I_{C+D}$ is generated; $I_A$ and $I_C$ are added, whereby a combined detection current $I_{A+C}$ is generated; and $I_B$ and $I_D$ are added, whereby a combined detection current $I_{B+D}$ is generated. In addition, all of the detection currents from the photodiodes A, B, C, and D are added together, whereby the sum of the quantity of light-detection current $I_{SUM}$ ($I_{A+B+C+D}$) is generated.

Each of the combined detection currents $I_{A+B}$, $I_{C+D}$, $I_{A+C}$, and $I_{B+D}$ is input to the combined detection current logarithmic compression circuit 25 wherein it is logarithmically compressed by using of a voltage between the base and emitter of a transistor. As a result, compressed outputs $V_{A+B}$, $V_{C+D}$, $V_{A+C}$, and $V_{B+D}$, expressed by a group of Equations (1), are output from corresponding combined detection currents $I_{A+B}$, $I_{C+D}$, $I_{A+C}$, and $I_{B+D}$, each compressed output being expressed as a voltage with a reference level whose potential is decreased from the reference voltage 31 (in this embodiment, it is set at 0 V) by a voltage obtained by logarithmically compressing the reference current $I_o$.

$$
\begin{aligned}
V_{A+B} &= -V_T \ln \frac{I_o}{I_s} - V_T \ln \frac{I_{A+B}}{I_s} \\
&= -V_T \ln \frac{I_o \cdot I_{A+B}}{I_s^2} \\
V_{C+D} &= -V_T \ln \frac{I_o}{I_s} - V_T \ln \frac{I_{C+D}}{I_s} \\
&= -V_T \ln \frac{I_o \cdot I_{C+D}}{I_s^2} \\
V_{A+C} &= -V_T \ln \frac{I_o}{I_s} - V_T \ln \frac{I_{A+C}}{I_s} \\
&= -V_T \ln \frac{I_o \cdot I_{A+C}}{I_s^2} \\
V_{B+D} &= -V_T \ln \frac{I_o}{I_s} - V_T \ln \frac{I_{B+D}}{I_s} \\
&= -V_T \ln \frac{I_o \cdot I_{B+D}}{I_s^2}
\end{aligned}
\tag{1}
$$

Wherein, $V_T = kT/q$
k: Boltzmann's constant
T: absolute temperature
q: electric charge of electron
$I_S$: saturation current in the reverse direction between base and emitter of transistor The sum of the quantity of light-detection current $I_{SUM}$, which has been input to the logarithmic compression circuit 26, is logarithmically compressed, whereby a compressed output $V_{SUM}$ of the sum of the quantity of light-detection current $I_{SUM}$, expressed by Equation (2), is obtained, the compressed output being expressed as a voltage with the reference voltage 31 (0 V) acting as reference $$V_{SUM} = -V_T \ln \frac{I_{SUM}}{I_s} \tag{2}$$

The compressed outputs $V_{A+B}$, $V_{C+D}$, $V_{A+C}$, and $V_{B+D}$ are impedance-converted by a voltage buffer circuit 27 while the compressed sum of the quantity of light output $V_{SUM}$ is impedance-converted by a voltage buffer circuit 28, and all these outputs are input to the expansion and I-V conversion circuit 29 in the next stage. In this expansion and I-V conversion circuit 29, the compressed combined outputs $V_{A+B}$, $V_{C+D}$, $V_{A+C}$, and $V_{B+D}$ are each subtracted from the compressed sum of the quantity of light output $V_{SUM}$ using the base and the emitter of the transistor, whereby they are expanded. That is, when the compressed sum of the quantity of light output $V_{SUM}$ is input to the base of the transistor and, for example, the compressed combined output $V_{A+B}$ is input to the emitter, the voltage $V_{BE}$ between the base and the emitter of the transistor is expressed by the following Equation (3):

$$V_{BE} = V_{SUM} - V_{A+B} = V_T \ln \frac{I_o \cdot I_{A+B}}{I_s \cdot I_{SUM}} \tag{3}$$

Then a corrector current $I_c$ expressed by the following Equation (4) is obtained:

$$I_c = \frac{I_o \cdot I_{A+B}}{I_{SUM}} \tag{4}$$

Therefore, by passing this corrector current $I_c$ through a resistor R, an output voltage $V'_{A+B}$ expressed by the following Equation (5) is obtained:

$$V'_{A+B} = RI_o \frac{I_{A+B}}{I_{SUM}} = G \cdot I_{A+B} \tag{5}$$

wherein, $G = RI_o/I_{SUM}$ (gain)

As can be clearly seen from Equation (5), the signal current $I_{A+B}$ is I-V-converted at a gain G which is in inverse proportion to the total quantity of light. That is, each detection current is divided by the sum of the quantity of light-detection current.

Similarly, output voltages $V'_{C+D}$, $V'_{A+C}$, and $V'_{B+D}$ are obtained by performing subtractions between the compressed sum of the quantity of light output $V_{SUM}$ and the other compressed combined outputs $V_{C+D}$, $V_{A+C}$, and $V_{B+D}$, and expanding them before applying I-V conversion.

Each signal voltage $V'_{A+B}$, $V'_{C+D}$, $V'_{A+C}$, and $V'_{B+D}$ which has been obtained by gain-control is input to the arithmetic circuit 30 in which subtraction is performed to obtain a tracking error output voltage ($V'_{A+B} - V'_{C+D}$) and a focus error output voltage ($V'_{A+C} - V'_{B+D}$).

In this invention, as described above, each detection current and the sum of the quantity of light detection-current obtained from the divided photodiodes are logarithmically compressed, and are subtracted for the purpose of performing divisions between them. Therefore, if the input current range is wide, such as from 1 μA to 100 μA, it can be made to be within a region of approximately 120 mV by conducting logarithmic compression so that correct gain control can be provided over a wide range.

Figure 4:
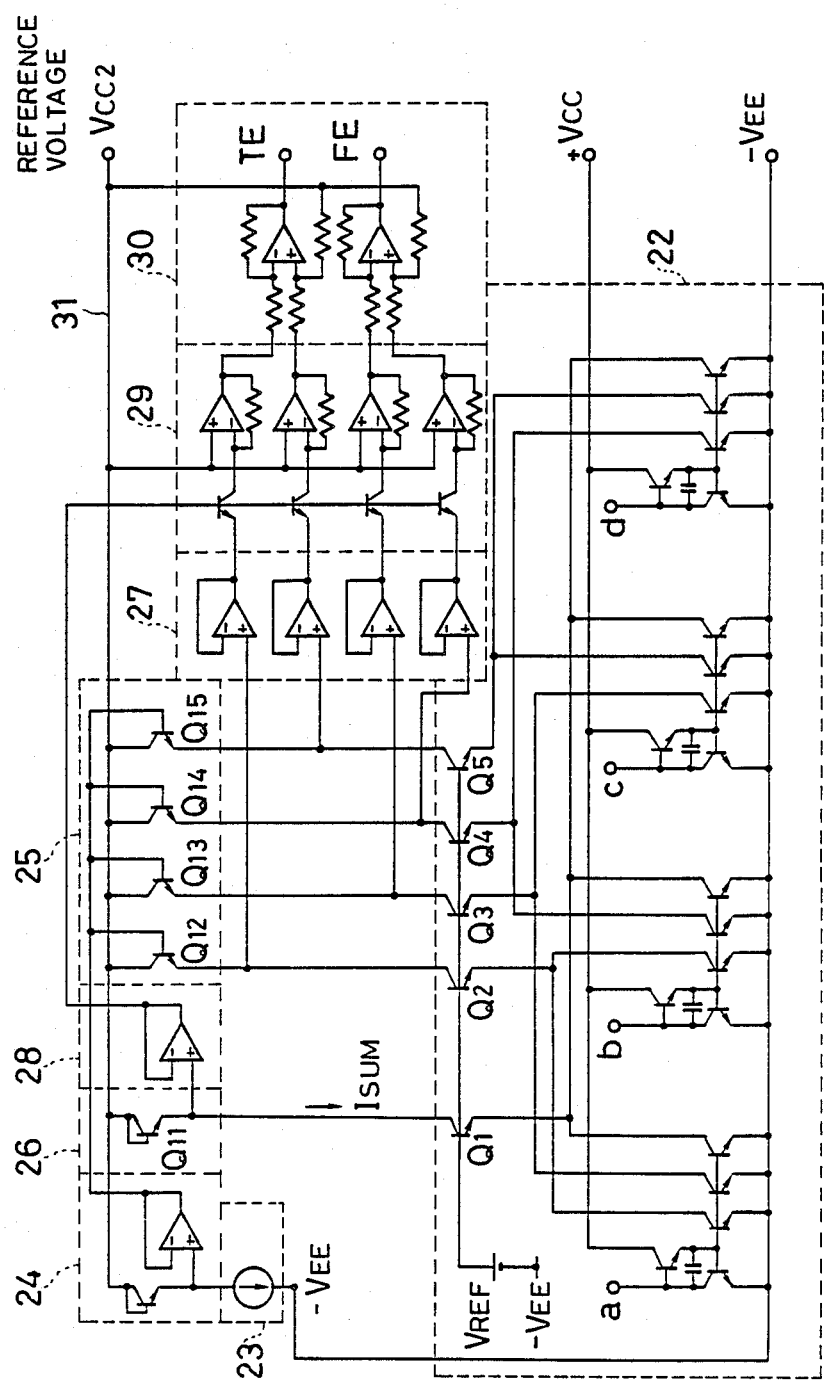
FIG. 4 is a specific example of a circuit of the same.

A specific example of a circuit for use in the system of control by the block diagram in FIG. 3 according to the present invention is shown in FIG. 4.

Circuits given reference numerals 22 to 30 in FIG. 4 are detailed examples of the blocks given the same numbers in FIG. 3. A characteristic of these specific circuits lies in the fact that emitters of base-grounded transistors $Q_1$, $Q_2$, $Q_3$, $Q_4$ and $Q_5$ are connected to output transistors of the current mirror in the current mirror matrix circuit 22 so that a voltage $V_{CE}$ between the corrector and emitter of each output transistor of the current mirror is aligned. As a result of this, the early effect is reduced in the current mirror, and the pair characteristic of the current mirrors can be improved even when the temperature changes. Symbols a, b, c, and d in the current mirror matrix circuit 22 respectively represent input terminals of the detection currents $I_A$, $I_B$, $I_C$, and $I_D$ of the photodiodes A, B, C, and D forming the photodetector 21. Each photodiode A, B, C, and D is arranged to be connected between a corresponding input terminals a, b, c, and d and a power source +Vcc.

The size of the emitter of the transistor $Q_1$ which is connected to the sum of the quantity of light detection current adder circuit in the current mirror matrix circuit 22 and that of the transistor $Q_{11}$ used with the logarithmic compression circuit 26 of $I_{SUM}$ are arranged to be twice the size of the emitters of the other transistors $Q_2$, $Q_3$, $Q_4$ and $Q_5$ in the current mirror matrix circuit 22 and those of transistors $Q_{12}$, $Q_{13}$, $Q_{14}$ and $Q_{15}$ in the combined detection current logarithmic compression circuit 25. This doubled size is provided because the sum of the quantity of light detection current $I_{SUM}$ is twice the quantity of each of the combined detection currents $I_{A+B}$, $I_{C+D}$, $I_{A+C}$ and $I_{B+D}$ when the focus servo system or the tracking servo system is locked, so the current density can be aligned with the current density of each transistor disposed in the path of each of the combined detection currents by doubling the size of the emitter of the transistor disposed in the path of the sum of the quantity of light detection current $I_{SUM}$. As a result of this, errors in division caused by changes in temperature or the quantity of incidental light can be significantly reduced.

As described above with reference to the embodiment of the present invention, detection currents from photo-detecting elements and a detection current corresponding to the total quantity of reflected light are logarithmically compressed, and subtractions are performed. As a result of this, each detection current is divided by the detection current corresponding to the total quantity of reflected light. Therefore, correct gain control can be provided over a wide input current range. Furthermore, since the magnitude of error can be correctly obtained regardless of the total quantity of the reflected light, focusing and tracking controls can be assuredly provided over a significantly wide range. Furthermore, a control system in a current mode is employed in which each detection current is directly logarithmically compressed using the constant current characteristics of photodiodes, without any necessity of providing current-voltage conversion. As a result of this, the following advantages can be obtained: problems such as drifting which occurs when a DC amplifier is used can be overcome, and circuits using ICs and of a monolithic type which will be helpful in terms of obtaining improved pair characteristic can be obtained.

I claim:

1. A control system for an optical recording-reproducing device comprising:
   a plurality of photo-detecting elements dividing and detecting reflected light from an optical disk;
   first compressing means for logarithmical compressing each detection current from said plurality of photo-detecting elements; and
   second compressing means for logarithmical compressing a total amount of light detection current obtained by adding said detection currents from said plurality of photo-detecting elements; wherein each logarithmic compression output of said first compressing means is subtracted from a logarithmic compression output of said second compressing means, wherein each detection current is divided by said total amount of light detection current to obtain a tracking error signal and a focusing error signal.

2. A control system for an optical recording-reproducing device according to claim 1, wherein said each detection current and said total amount of light detection current are directly logarithmical compressed as a current by means of each of said logarithmic compression means.

3. A control system for an optical recording-reproducing device according to claim 1, wherein four quadrant photodiodes are used for each said photo-detecting elements, and said tracking error signal and said focusing error signal are obtained from combined detection currents of pairs of photodiodes arranged in lateral and longitudinal directions.

4. A control system for an optical recording-reproducing device according to claim 3, wherein said combined detection current of said pair of photodiodes arranged in a lateral and a longitudinal direction and said total amount of light detection current from said photodiodes are output by a current mirror matrix circuit.

5. A control system for an optical recording-reproducing device according to claim 4, wherein each output from said current mirror matrix circuit is output through common base transistors.

6. A control system for an optical recording-reproducing device according to claim 4, wherein said combined detection current and said total amount of light detection current from said current mirror matrix current is directly logarithmical compressed by said first and second logarithmical compression means.

7. A control system for an optical recording-reproducing device according to claim 5, wherein said combined detection current and said total amount of light detection current from said current mirror matrix circuit is directly logarithmical compressed by said first and second logarithmic compression means.

8. A control system for an optical recording-reproducing device according to claim 1, wherein each of said logarithmic compression means is formed by transistors which are each arranged to perform said logarithmic compression using a voltage between a base and an emitter thereof.

9. A control system for an optical recording-reproducing device according to claim 1, wherein said logarithmic compression output of said combined detection current from said first logarithmic compression means and said logarithmic compression output of said total amount of light detection current from said second logarithmic compression means are input to an expansion-circuit which uses a base and an emitter of a transistor wherein a subtraction is performed to achieve expansion, and said outputs are I-V converted by an I-V conversion circuit, in a way that results in a division of said combined detection currents by said total amount of light detection current is output thereby.

10. A control system for an optical recording-reproducing device according to claim 9, wherein each combined detection output divided by said total amount of light detection current which is output from said expansion and I-V conversion circuits is subtracted by an arithmetic circuit, in such a way that a tracking error signal and a focus error signal can be formed.

* * * * *